United States Patent [19]

Jones

[11] 4,373,323
[45] Feb. 15, 1983

[54] TOBACCO LEAF STRIPPER

[75] Inventor: Thomas F. Jones, Maysville, Ky.

[73] Assignee: Tobacco Machinery Co. of Ky. Inc., Maysville, Ky.

[21] Appl. No.: 262,601

[22] Filed: May 11, 1981

[51] Int. Cl.³ .......................................... A01D 45/16
[52] U.S. Cl. .................................... 56/27.5; 171/61
[58] Field of Search ....................... 56/27.5; 171/61; 130/30 R, 3 B

[56] References Cited

U.S. PATENT DOCUMENTS

| | | | |
|---|---|---|---|
| 3,142,304 | 7/1964 | Hoernmann | 131/149 |
| 3,800,518 | 4/1974 | Baggiolini et al. | 171/61 |
| 4,037,666 | 7/1977 | Rath et al. | 56/27.5 |
| 4,122,901 | 10/1978 | Koepplin | 171/61 |
| 4,136,509 | 1/1979 | Lenker et al. | 171/61 |
| 4,292,982 | 10/1981 | Butcher | 130/30 |

FOREIGN PATENT DOCUMENTS

| | | | |
|---|---|---|---|
| 429776 | 11/1974 | U.S.S.R. | 56/27.5 |
| 333783 | 4/1976 | U.S.S.R. | 56/27.5 |
| 643113 | 1/1979 | U.S.S.R. | 56/27.5 |

*Primary Examiner*—Robert A. Hafer
*Attorney, Agent, or Firm*—King and Liles

[57] ABSTRACT

A tobacco stripper has a pair of counter-rotating gear belts which are used to separate tobacco leaves from tobacco stalks when the stalk is advanced into a nip formed by the counter-rotating belts.

9 Claims, 5 Drawing Figures

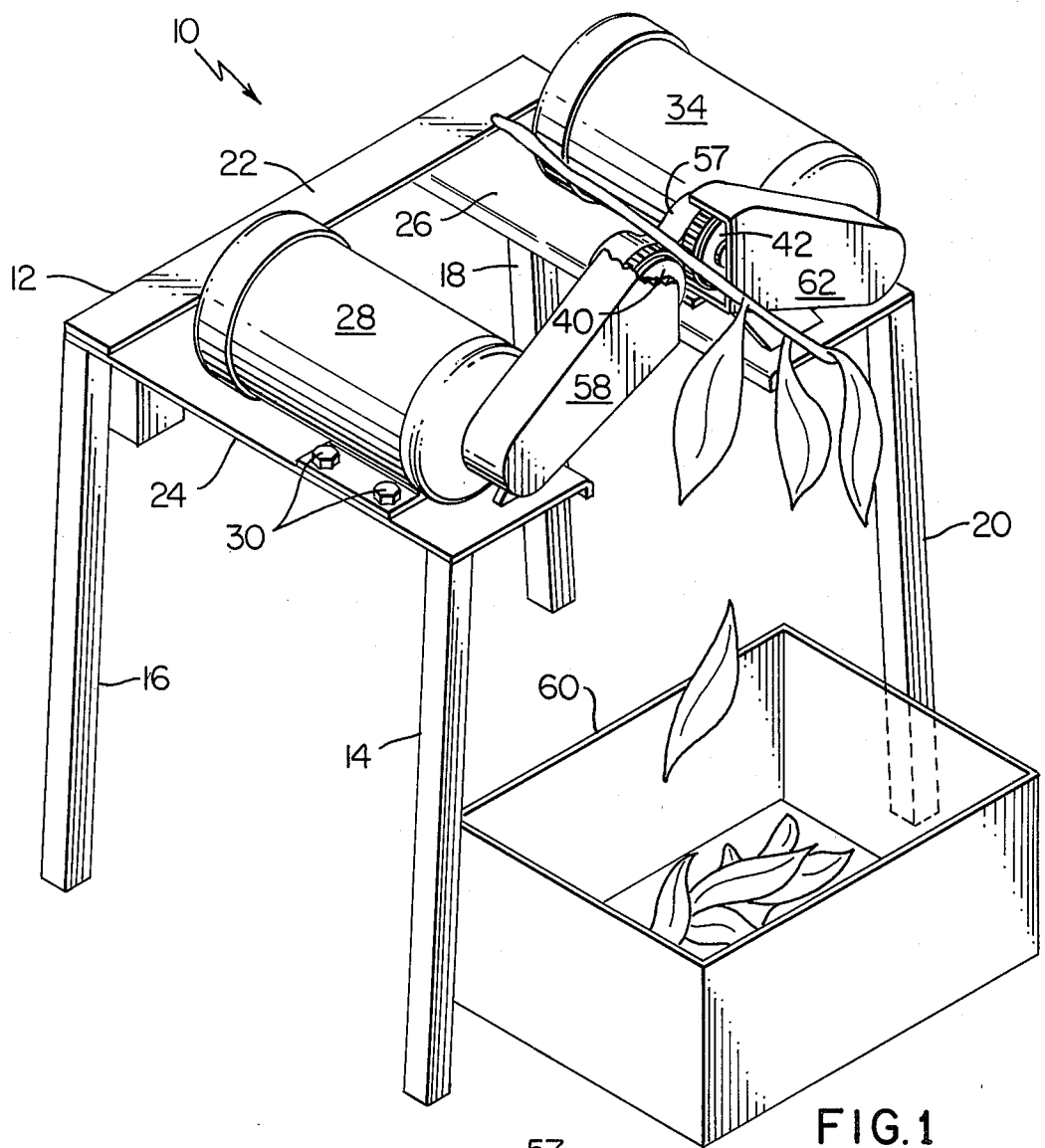
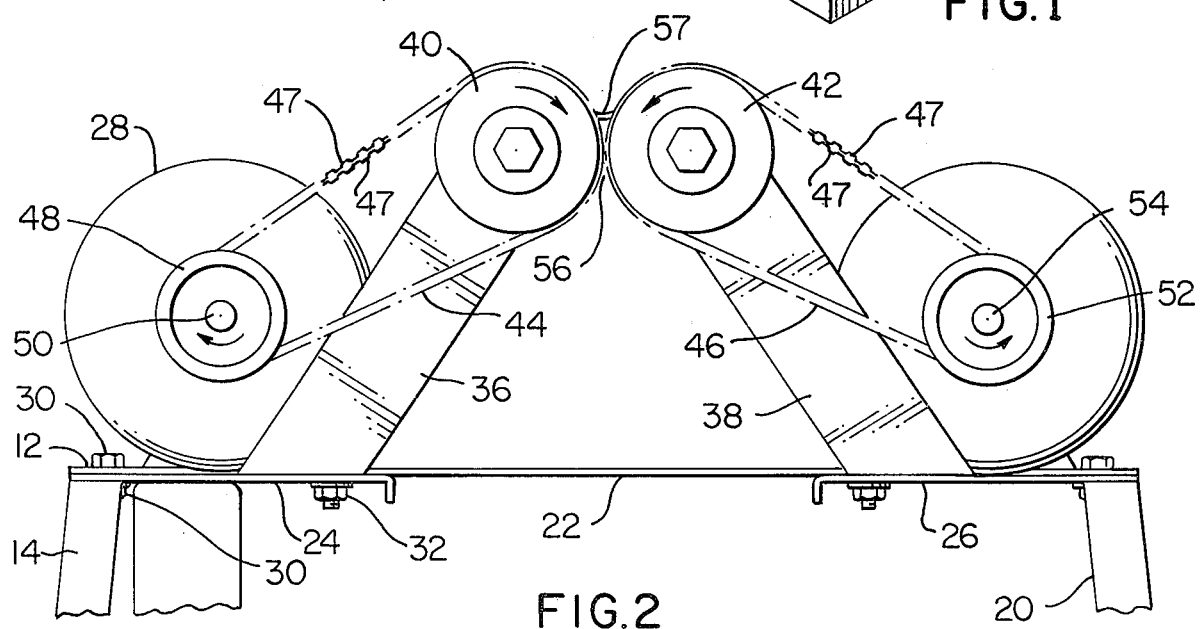

TOBACCO LEAF STRIPPER

BACKGROUND

The present invention relates to a method and apparatus for processing tobacco and more particularly concerns a method and apparatus for removing tobacco leaves from the stalk of a tobacco plant.

In the processing of tobacco, as for example burley tobacco, it is necessary to cut the tobacco plants in a field and to thereafter house the tobacco by hanging it in a barn for curing. After the tobacco is cured, the leaves of the plant must be removed or stripped from the stalk of the plant.

The stripping of tobacco accounts for a major component of the cost labor associated with processing tobacco. Statistics from the U.S. Dept. of Agriculture indicate that it takes approximately 130 hours to strip an acre of tobacco whereas it takes approximately 10 hours to cut it and 40 hours to house it. Escalating labor prices make the time required for stripping tobacco of increasing importance. It follows that reducing the labor time required for stripping may be of significant economic advantage.

The large time requirements of tobacco stripping occasionally cause problems of farmers in getting tobacco ready for market. After sufficiently curing in a barn, the tobacco is allowed to set in the barn until the occurrence of a wet humid period. A wet humid period permits the tobacco to come "in case", in which the humidity softens the tobacco so that it may be handled without breaking. If the tobacco is not "in case", it will be very brittle and will crumble when touched. It thus commonly occurs that weather conditions place stringent time requirements on farmers between the time the tobacco becomes "in case" and the opening of the tobacco auction (burley tobacco is sold each year at an annual tobacco auction). When the period for processing tobacco is insufficient for the large time required for stripping, the tobacco simply does not make it to market.

In the processing of tobacco, the farmer is also required to grade the leaves of the tobacco. The grade of a tobacco leaf is dependent upon its relative vertical position on the stalk. Going from the ground upwardly toward the tip (as the plant grows in the ground) are the following grades or types of tobacco: trash, flyings, lugs, bright, red and tip. The various grades of tobacco are segregated after removal of the leaves from tobacco stalk and separate grades are bailed separately, different grades sealing for different prices. Grading of tobacco places even further time burdens upon a tobacco farmer.

It is thus an object of the present invention to provide a method and apparatus for expediting the process of stripping tobacco.

It is a further object of the present invention to provide a method and apparatus for reducing the manpower requirements for stripping tobacco.

It is another object of the present invention to provide a method and apparatus for stripping tobacco more economically.

It is yet another object of the present invention to provide a method and apparatus for grading tobacco efficiently.

Still another object of the present invention is to provide a method and apparatus that permits stripping of tobacco in a wide range of humidity conditions.

SUMMARY OF THE INVENTION

In accordance with the invention, a tobacco stripper is provided which includes a base and at least four radially aligned rotatable pulleys having parallel axes of rotation supported upon the base. A pair of radially aligned counter-rotating endless belts are rotatably carried by the pulley, each endless belt being engaged on its interior surface by at least two of the pulleys. The belts have non-smooth exterior surfaces. At least one pulley engaging the interior surface of each belt forms a spaced nip between the belts to accommodate a tobacco stalk. Drive means are associated with at least one pulley engaged with each belt to produce counter-rotating movement of the two belts.

According to a further aspect of the invention, the space between the counter-rotating belts in the nip is greater than zero but less than or equal to one-eighth inch.

In accordance to a further aspect of the invention, the non-smooth exterior surfaces of the belts have segmented teeth and in accordance with a still further aspect of the invention, these teeth are spaced from each other by a tooth space of approximately three-eighths inch.

Yet another aspect of the invention involves rotating the counter-rotating belts with a linear velocity between 1200 feet per minute and 1600 feet per minute and according to a specific aspect, the belts are rotated at approximately 1400 feet per minute.

A still further aspect of the invention involves using pulleys of approximately three inch diameter to form the nip and using pulleys with teeth to matingly mesh with segmented teeth on the interior surface of the belts.

Another aspect of the invention using a stalk support to span the distance between the pulleys forming the nip.

In accordance with a still further aspect of the invention, a method of stripping tobacco includes rotating a pair of counter-rotating endless belts having non-smooth exterior surfaces so as to form a nip between the belts. The method further includes advancing a tobacco stalk with tobacco leaves thereon into the nip from the bottommost leaves toward the tip of the stalk in a direction substantially parallel to the axes of rotation of the counter-rotating belts. The leaves are then impacted by the belts and separated from the stalk, after which the separated leaves are collected.

BRIEF DESCRIPTION OF THE DRAWINGS

Other objects and advantages of the invention will become apparent upon reading the following detailed description and upon reference to the drawings, in which:

FIG. 1 is a perspective view of one embodiment of a tobacco stripper of the present invention illustrating a tobacco stalk being fed through the nip of a pair of counter-rotating picker belts.

FIG. 2 is a front elevational view of the tobacco stripper of FIG. 1.

Figure 3:
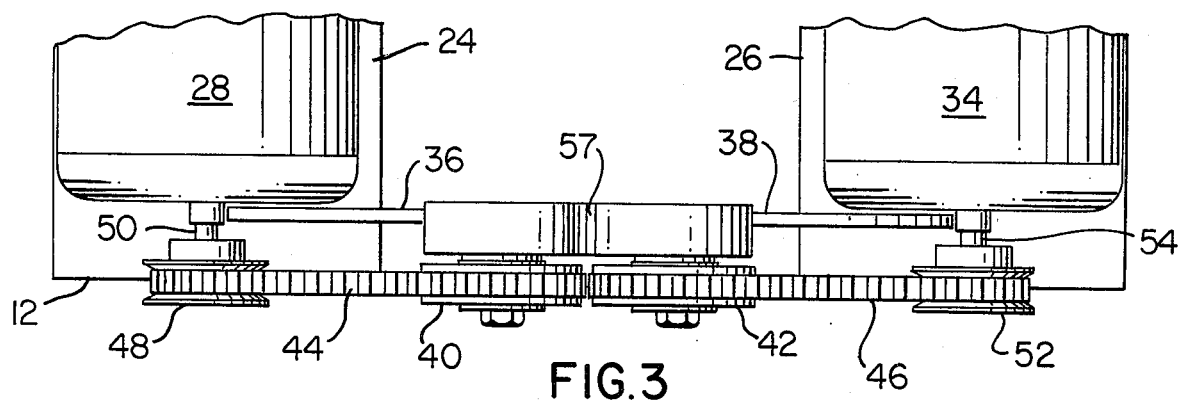
FIG. 3 is a fragmentary plan view of the picker belts of FIGS. 1 and 2 and further showing a stalk support spanning the nip between the two picker belts but axially spaced therefrom.

While the invention will be described in connection with a preferred embodiment and method, it will be understood that it is not intended to limit the invention to that embodiment or method. On the contrary, it is intended to cover all alternatives, modifications and equivalents as may be included within the spirit and scope of the invention as defined by the appended claims.

DETAILED DESCRIPTION OF THE PREFERRED EMBODIMENT

Referring now to the drawings, FIG. 1 shows a tobacco stripper constructed in accordance to the preferred embodiment in the process of stripping tobacco leaves from a tobacco stalk. Purchasers of tobacco wish only to buy tobacco leaves and for a farmer to sell tobacco it is necessary to separate the leaves of the tobacco from the tobacco stalk. The tobacco stalks upon which the leaves grow are generally discarded after the leaves are removed. The illustrated tobacco stripper which is generally designated by the numeral 10 in the drawings and includes a base 12 which includes four upstanding vertical legs 14, 16, 18 and 20, legs 14 and 20 being on the front side of the base 12 and legs 16 and 18 being on the rear side of the base 12. The rear legs 16 and 18 are joined by a rigid support member 22 spanning the distance therebetween. A first platform support 24 rigidly connects front leg 14 with rear leg 16 and a second and similar platform support 26 rigidly connects the front leg 20 with the rear leg 18. Front legs 14 and 20 are not directly connected to each other with a member corresponding to support member 22. However, these front legs 14 and 20 are rigidly held in a spaced relationship with each other by virtue of their connections to rear legs 16 and 18 respectively.

Figure 4:
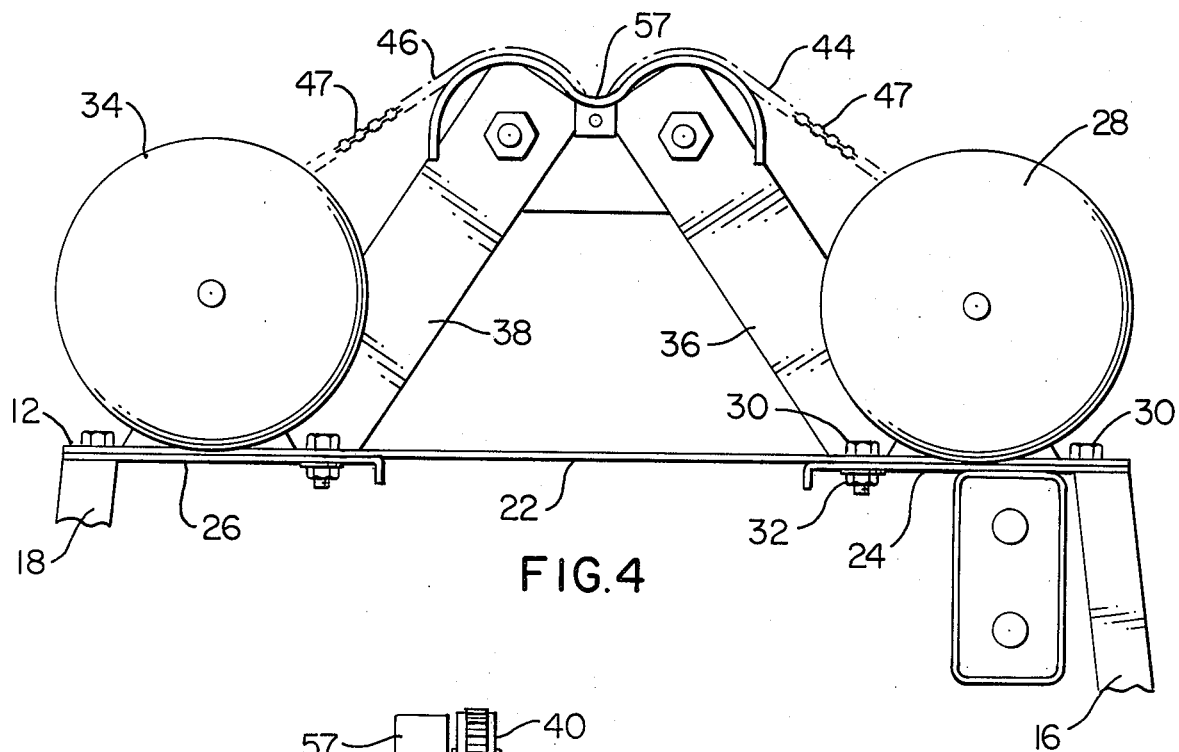
FIG. 4 is a rear elevational view of the tobacco stripper of FIGS. 1-3.
Figure 5:
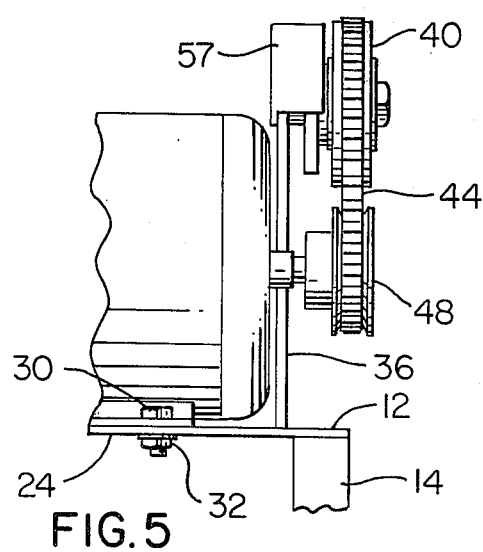
FIG. 5 is a fragmentary side elevational view of a motor drive and picker belt of the tobacco stripper of FIGS. 1-4.

A first electric drive motor 28 is rigidly and firmly secured to the first platform support 24 through the agency of suitable fasteners such as bolts 30 illustrated on FIG. 1 and nuts 32 illustrated in FIGS. 2 and 4. Similarly, a second electric motor drive 34 is also bolted to the second platform support 26 in an identical manner. As perhaps shown most clearly in FIGS. 2 and 4, pulley supports 36 and 38 are secured to platform supports 24 and 26 respectively proximal to but in front of the drive motors 28 and 34. The pulley supports 36 and 38 extend obliquely upwardly from the platform supports 24 and 26 and converge toward each other. Rotatably attached to the upward ends of these pulley supports 36 and 38 are radially aligned but spaced pulleys 40 and 42, pulley 40 being attached to pulley support 36 and pulley 42 being attached to pulley support 38.

The pulleys 40 and 42 are gear or timing belt pulleys and receive endless double toothed impact or picking belts 44 and 46 respectively, each belt 44 and 46 being a gear or timing belt and having a plurality of teeth 47 on both its interior and exterior periphery. In the most preferred form, the belt is formed of polyurethane. However, other suitable materials such as rubber, nylon or even steel may be used. The belts 44 and 46 must have non-smooth exterior surfaces that will impact with the tobacco leaf, separating it from the stalk. The belts 44 and 46 thus pick the tobacco leaves from the stalk. The endless toothed impact belt 44 is also received by a pulley 48 which is rotatably driven by a shaft 50 of electric drive motor 28. In a similar manner, the endless toothed impact belt 46 is also received by a driven pulley 52 which is driven by shaft 54 of the electric drive motor 34. Each of the illustrated pulleys 44 and 46 and 48 and 52 have teeth receptive openings that match the teeth on impact belts 44 and 46. As viewed in FIG. 2, shaft 50 is rotated clockwise and shaft 54 is rotated counterclockwise. It follows that pulleys 40 and 48 and belt 44 follow the clockwise rotation of shaft 50 and that pulleys 42 and 52 and belt 46 follow the counterclockwise rotation of shaft 54.

The pulleys 40 and 42 are three inch diameter pulleys in the preferred embodiment and are in side by side relationship to each other. They are radially spaced so that the outer diameters of the impact belts 44 and 46 do not come into contact with each other but are spaced by a distance no greater than ⅛ of an inch in the throat area 56 (see FIG. 2) in the nip formed between the two pulleys 40 and 42. In FIG. 1, cover guards 58 and 60 partially conceal the rotating belts 44 and 46 and serve to prevent accidental engagement with the belts.

The distance between the pulleys 40 and 42 is spanned by a

The distance between the pulleys 40 and 42 is spanned by a stalk support 57 upon which the tobacco stalk may rest during the impact period in which the leaves are sheared from the stalk. This stalk support 57 assists the operator in holding the stock against the force produced by the counter-rotating impact belts 44 and 46. This stalk support may be in the form of a roller with a horizontal axis of rotation substantially to the axes of rotation of the pulleys 40 and 42. A roller support, not only provides a support to counter the downward force resulting from the impact of the tobacco with the teeth, it reduces friction and assists the operator in axially advancing the stalk between the belts 44 and 46.

In operation, the electric motors 28 and 34 are rotated so as to counter-rotate the endless toothed belts 44 and 46. It has been found that a rotational speed which imparts a linear belt speed of approximately 1400 feet per minute is preferable. However, rotational speeds between 1200 and 1600 feet per minute have been found to produce acceptable results. The teeth on belts 44 and 46 have spaces "S" (see FIG. 4) between the teeth which are approximately three eights inch and are adapted to accommodate the diameter of a tobacco stalk. As may be seen in the depiction of FIG. 2, both the teeth and spaces (s) extend transversely across the entire width of the belts 44 and 46 in a direction substantially perpendicular to the direction of belt movement. A stalk of tobacco with the leaves in tack is then axially advanced from bottom to top between the pulleys 40 and 42, from the front to the rear of the apparatus 10. When so advanced, the teeth 47 on one or the other of the counter-rotating endless belts 44 or 46 will strike the leaves in the vicinity of the interface between the tobacco stalk and the leaf. The impact of the engagement of the tooth will shear the connection between the leaf and the stalk and will accelerate the leaves downward to a collection location. Since tobacco leaves are relatively large leaves with large surface areas, substantial wind resistance against the large leaf area may slow the gravity biased downward movement of the leaves. Consequently, downward acceleration of the leaves is desirable to augment the gravity biased movement. The collection location may be either a container, such as box 60 in FIG. 1 or it may be a moving transport member such as a conveyor (not shown). As the tobacco stalk is axially advanced into the throat between the two counter-rotating impact belts 44 and 46, additional leaves are sheared and accelerated downwardly. Since tobacco leaves grow upwardly from their connection with the stalk, the stalk is advanced into the throat between the two belts 44 and 46 from butt (bottom) to tip (top). Thus, the leaf is severed and accelerated downward before the majority of the leaf itself is passed between the counter-rotating belts.

The illustrated stripper 10 is also well suited for stripping and grading operations. As noted above, the grade of a tobacco leaf is dependent upon that leaf's relative position on the stalk. The illustrated stripper 10 removes leaves from the stalk only after the stalks are axially advanced into throat 56 between the counter-rotating pulleys 40 and 42. Since the axial advancement of the stalk is done manually, the advancement may be terminated at will and may be done so as to remove only particular grades of tobacco leaves. The stalk with the remaining other grades of leaves may then either be set aside for a subsequent run through the same stripping apparatus at which time the remaining grades may be removed. Alternatively, several different machines may be used in which case after the leaves of a particular grade were removed from a particular stalk, that stalk would be taken to a different machine for removal of different grades. In either of these alternatives, all of the leaves removed from stalks onto a conveyor or into a box 60 during a particular period would have a common grade. Consequently, the bailing of individual grades would be greatly facilitated.

In the past, tobacco has been very difficult to strip by hand when the tobacco is not in high case. It has been found, however, that the impact imparted by the illustrated stripper permits stripping on occasions when hand stripping is not possible. This capability permits the farmer to strip tobacco and prepare it for market in a wider range of humidity conditions.

Moreover, when tobacco is stripped by hand, small pieces of leaves remain on the stalk when the leaves are pulled off. These leaf remnants are termed leavings and represent considerable waste. It has been founded that the illustrated apparatus removes these leavings from the stalk. These leavings may represent as much as a hundred pounds of tobacco per acre above the yield of the same tobacco stripped by hand. Further, the stripper 10 initially collects the tobacco leaves directly beneath the nip of pulleys 40 and 42, either on a conveyor or a container 60. This collected quantity of tobacco will then be fed to bailer. Consequently, any knock-off or leaf particles separated from the main leaf portion during the stripping operation will fall into the same collection and avoid the normal knock-off loss.

Thus it is apparent that there has been provided, in accordance with the invention, a method and apparatus that fully satisfies the objects, aims, and advantages set forth above. While the invention has been described in conjunction with a specific embodiment and method, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A tobacco stripper for removing dried and cured tobacco leaves from a tobacco stalk severed from the ground, comprising:
   (a) a base;
   (b) at least four radially spaced and aligned rotatable pulleys having parallel axes of rotation supported upon said base;
   (c) a pair of radially aligned counter-rotating endless belts rotatably carried by said pulleys, at least two of said pulleys engaging the interior surface of each of said belts, said belts have a plurality of impact teeth on their exterior surfaces, said teeth being separated from each other in the direction of belt movement by an interposed spacing adapted to accommodate the diameter of a tobacco stalk, said teeth and interposed spacing extending transversely across the entire width of the belts in a direction substantially perpendicular to the direction of belt movement, at least one pulley engaging the interior surface of each belt, said at least one pulley being separated to form a spaced nip between the belts adapted to accommodate a tobacco stalk; and
   (d) drive means associated with at least one pulley engaged with each belt, said drive means being operative to produce counter-rotating movement of said belts.

2. A tobacco stripper as recited in claim 1 wherein the space between said counter-rotating belts in the nip is greater than zero but less than or equal to one-eighth inch.

3. A tobacco stripper as recited in claim 2 wherein the non-smooth exterior surfaces of said belts have segmented teeth.

4. A tobacco stripper as recited in claim 3 wherein the teeth on the exterior of said belts are spaced from each other by a tooth space of approximately three-eights inch.

5. A tobacco stripper as recited in claim 4 wherein each of said counter-rotating belts are rotated with a linear velocity between approximately 1200 feet per minute and 1600 feet per minute.

6. A tobacco stripper as recited in claim 4 wherein said pulleys forming the nip between the belts have diameters of approximately three inches.

7. A tobacco stripper as recited in claim 4 wherein said belts have teeth on both interior and exterior surfaces, the teeth on said interior surface being in meshing relation with mating teeth on at least one of said pulleys.

8. A tobacco stripper as recited in claim 6 further including a stalk support spanning the radial distance between the pair of counter-rotating belts forming the nip.

9. A method of stripping dried and cured tobacco leaves from a tobacco stalk severed from the ground, comprising:
   (a) rotating a pair of radially aligned counter-rotating endless belts having a plurality of spaced impact teeth on their exterior surfaces spaced extending substantially transversely to the direction of belt movement and so as to form a nip therebetween;
   (b) advancing a tobacco stalk severed from the ground with dried and cured tobacco leaves thereon into the nip from the bottommost leaves toward the tip of the stalk in a direction substantially parallel to the axes of rotation of said counter-rotating belts;
   (c) impacting the leaves with the impact teeth on the rotating belts so as to separate the leaves from the stalk; and
   (d) collecting the separated leaves.

* * * * *